(12) United States Patent
Fujisawa

(10) Patent No.: US 7,821,661 B2
(45) Date of Patent: Oct. 26, 2010

(54) IMAGING APPARATUS, INFORMATION DEVICE INCLUDING THE SAME, AND IMAGING METHOD THEREFOR

(75) Inventor: Takahiro Fujisawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1159 days.

(21) Appl. No.: 11/392,605

(22) Filed: Mar. 30, 2006

(65) Prior Publication Data

US 2006/0227344 A1  Oct. 12, 2006

(30) Foreign Application Priority Data

Mar. 31, 2005 (JP) ............... 2005-100783
Oct. 19, 2005 (JP) ............... 2005-304607

(51) Int. Cl.
*G06F 9/00* (2006.01)
*G06K 15/00* (2006.01)

(52) U.S. Cl. ..................... 358/1.15; 382/100

(58) Field of Classification Search ........... 358/1.15, 358/1.16, 1.14, 1.13, 1.18, 488, 475, 906, 358/1.6, 302, 405, 494; 382/124, 100, 106, 382/115, 103, 107; 380/252; 455/557, 187.1, 455/411; 709/203, 217, 201, 223; 400/62, 400/76

See application file for complete search history.

(56) References Cited

U.S. PATENT DOCUMENTS 7,369,164 B2 * 5/2008 Parulski et al. ......... 348/231.99

2003/0164978 A1 * 9/2003 Song .................. 358/1.18
2009/0059014 A1 * 3/2009 Rothschild ............. 348/207.1

FOREIGN PATENT DOCUMENTS

| JP | 11-88815 | 3/1999 |
|---|---|---|
| JP | 2002-354309 | 12/2002 |
| JP | 2003-78844 A | 3/2003 |
| JP | 2003-111009 A | 4/2003 |
| JP | 2004-96761 | 3/2004 |
| JP | 2004-255760 A | 9/2004 |
| JP | 2004-274093 | 9/2004 |
| JP | 2005-94700 | 4/2005 |
| JP | 2005-109920 | 4/2005 |
| JP | 2005-151521 | 6/2005 |

* cited by examiner

Primary Examiner—Saeid Ebrahimi Dehkordy
(74) Attorney, Agent, or Firm—Oblon, Spivak, McClelland, Maier & Neustadt, L.L.P.

(57) ABSTRACT

An imaging apparatus (1), including: a recording unit (11) configured to record as an image file (200) an image data generated by conversion from an optical image representing a subject to an electrical signal in an imaging device (12); an interface (15) for connecting the imaging apparatus (1) to an external device; an information adding unit (10) configured to add information to the image file (200); and an print request unit (10) configured to issue a request to a printer (2) to print out only the image file (200) to which the information is added by the information adding unit (10) when the image file (200) is printed out.

6 Claims, 11 Drawing Sheets

FIG. 3

```
/*ITEM*/
01. NAME
02. DEPARTMENT
03. POST
/*LIST*/
#01
01. Taro RICOH
02. Jiro RICOH
03. Ichiro RICOH
04. Saburo RICOH
05. Shiro RICOH
06. Hana RICOH
07. Kako RICOH
08. Hanako RICOH
#02
01. ACCOUNTING DEPARTMENT
02. ADMINISTRATIVE DEPARTMENT
03. SALES DEPARTMENT
04. DESIGNING DEPARTMENT
05. HUMAN RESOURCES DEPARTMENT
#03
01. SECRETARY
02. FOREPERSON
03. CHIEF
04. ASSISTANT GENERAL MANAGER
05. GENERAL MANAGER
```

FIG. 8

```
         81
        ↙      82
<printRiquest>  ↙              83
        <printFile>            ↙
                  RIMG0001.JPG
        </printFile>
</printRiquest>
```

FIG. 9

| RIMG0001.JPG | 0 |
| RIMG0021.JPG | 1 |
| RIMG0022.JPG | 2 |
| . | . |
| . | . |
| . | . |
| RIMG0143.JPG | n |

FIG. 10

```
         81
        ↙      82
<printRiquest>  ↙
        <printFile>
                  RIMG0001.JPG    83
                  RIMG0021.JPG    ↙
                  RIMG0022.JPG
                  RIMG0100.JPG
                  RIMG0143.JPG
        </printFile>
</printRiquest>
```

IMAGING APPARATUS, INFORMATION DEVICE INCLUDING THE SAME, AND IMAGING METHOD THEREFOR

BACKGROUND

1. Field of the Invention

The present invention relates to an imaging apparatus and an imaging method capable of transmitting a photographed picture image without passing through a personal computer and the like to print out the picture image. Specifically, the invention relates to an imaging apparatus and an imaging method with which an operation for selecting an image to be printed out can be easily carried out.

2. Description of Related Art

A digital camera is generally known as an imaging apparatus configured to convert a picture image photographed by an imaging device thereof into digital signals and record them on a recording device such as a nonvolatile storage medium. Conventionally, data of a picture image (image file) are transferred to an information processing apparatus such as a personal computer and the like and image processing are carried out together with processing of control of a printing apparatus (printer) with use of an application program for picture image processing to print out a picture image taken by a digital camera. Currently, for more easy print of a picture image, it has been popularly used a direct print function which allows a digital camera to be directly connected to a printer and transfer picture image information stored in the digital camera thereto to print out the picture image(s).

In the case a picture image taken by the above-mentioned imaging apparatus and additional information regarding the picture image (e.g. a photographed date of the picture image) are combined and are then printed out, conventionally an operation for determining whether such additional information is to be added to the picture image or not is conducted at the time a user selects the picture image to be printed out. There is known a conventional invention capable of allowing a user to make an appropriate selection more easily to reduce difficulty in selecting an appropriate printer format (print pattern) which is suitable for printing additional information from among various printer formats which vary according to output forms (e.g. JP11-88815A).

According to the structure of the invention described in JP11-88815A, a selection of a picture image to be printed out can be made by way of visibly confirming a reduced-size image displayed on a display device provided for an imaging apparatus. Thus, a lot of selection operations are required for a user in order to set whether additional information is printed out or not properly, giving rise to trouble in making a simple selection of a desired picture image only.

SUMMARY

The present invention has been made in consideration of above mentioned actualities, thus one object of the invention is to provide an imaging apparatus capable of adding information to a photographed picture image to allow a user to select easily the picture image concerned according to the added information when printing out is carried out.

One aspect of the present invention is that an imaging apparatus includes: a recording unit configured to record as an image file an image data generated by conversion in an imaging device from an optical image representing a subject to an electrical signal; an interface for connecting the imaging apparatus to an external device; an information adding unit configured to add information to the image file; and an print request unit configured to issue a request to a printer to print out only the image file to which the information is added by the information adding unit when the image file is printed out.

One aspect of the present invention is that an imaging method, includes: recording as an image file image data generated by conversion from an optical image representing an imaged subject; communicating an external device connected through an communication interface; adding information to the image file; and requesting a printer to print out only the image file to which the information is added in the adding process when the image file is to be printed out.

In the imaging apparatus/method, a request to print out only an image file to which information including specified information is added may be transmitted to the printer. Further, the imaging apparatus may include an input device for selecting whether only an image file to which information including specified information is added is requested to be printed out or not.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims The present application is based on, and claims priority from, Japanese Patent Application No. 2005-100783, filed on Mar. 31, 2005 and Japanese Patent Application No. 2005-304607, filed on Oct. 19, 2005, the contents of which are hereby incorporated by reference herein in its entirety.

BRIEF DESCRIPTION OF THE DRAWINGS

For a better understanding of the invention, reference is made to the attached drawings, wherein:

FIG. 3 is a view showing an example of additional information applicable to the present invention;

FIG. 8 is a view showing an example of description of an information file of print request to be transmitted to a printer from a digital camera, applicable to the present invention;

FIG. 9 is a view showing an example of a list table made in a print process carried out by an imaging apparatus according to the present invention;

FIG. 10 is a view showing another example of description of an information file of print request to be transmitted to a printer from a digital camera, applicable to the present invention;

DETAILED DESCRIPTION OF THE PREFERRED EMBODIMENTS

Figure 1:
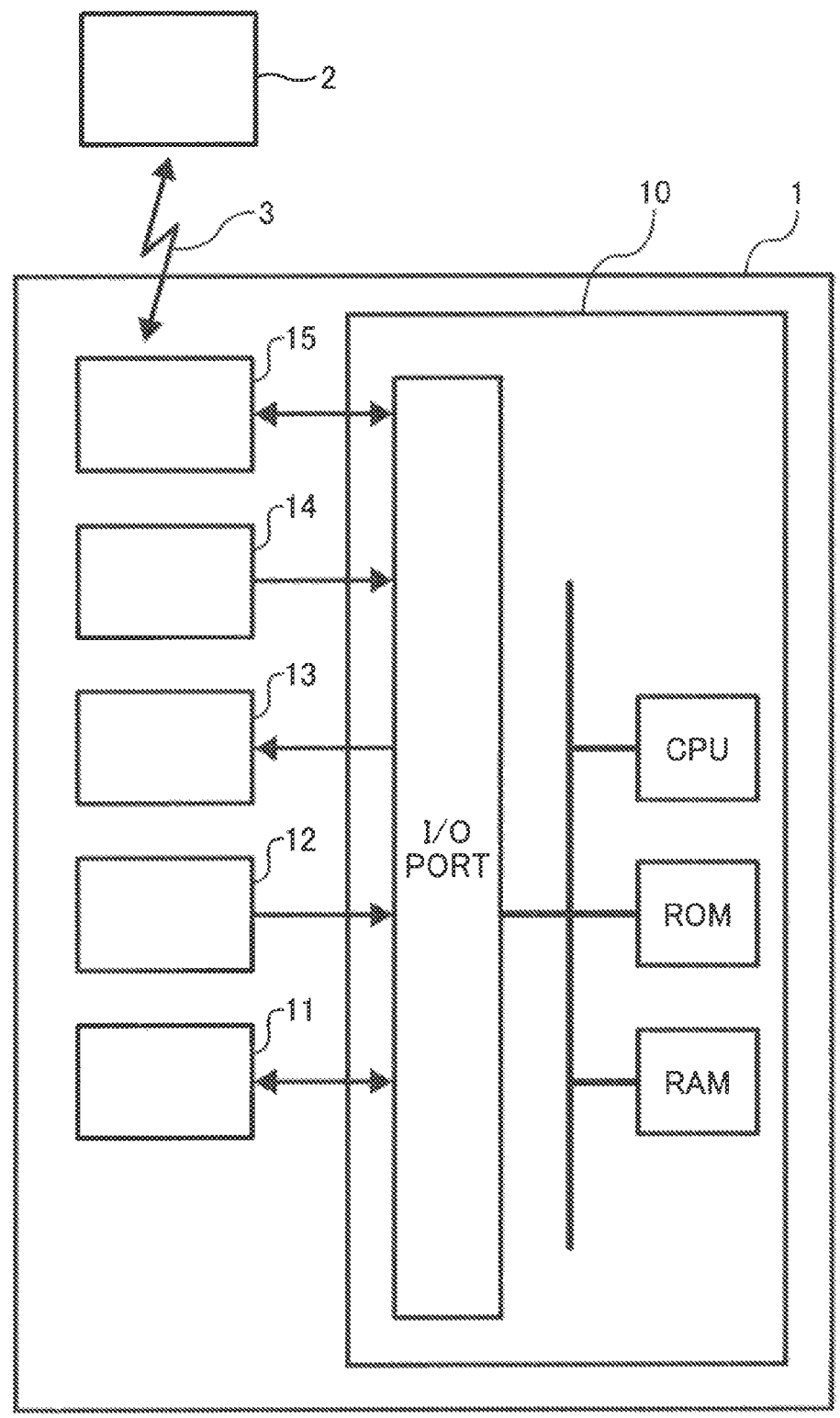
FIG. 1 is a block diagram showing a control system of a digital camera as one example of an imaging apparatus according to the present invention.

An embodiment of the present invention will be described below referring to the drawings. FIG. 1 is a functional block diagram showing an example of an imaging apparatus according to the present invention.

In FIG. 1 a digital camera as an imaging apparatus of the present invention is provided with an external recording unit 11 configured to record information, an imaging unit 12 as an input portion including a CCD, an AD converter, etc., a display unit 13 configured to display various information concerning photographing operations and photographed image settings, a operational table unit 14 as an input device by which operational inputting from outside is carried out, a communication I/F unit 15 configured to control a communication interface to a printer 2, and an entire control unit 10 configured to control the digital camera 1 entirely.

The external recording unit 11 includes a recording medium represented by a flash memory, etc. and a driver unit for controlling operations of writing in/readout from the recording medium. The entire control unit 10 can be composed of a conventionally-known microcomputer including a CPU, a ROM, a RAM, an input/output port (I/O port), bus lines which connect therebetween and the like.

The communication I/F unit 15 is connected to the printer 2 through a communication device 3 to be able to communicate with the printer 2. Either wire transmission or wireless transmission can be used for the communication device. A USB (Universal Serial Bus) can be a typical example for wire transmission. A short-range wireless communication system such as Bluetooth, Wi-fi (wireless LAN standards), IrDA, etc. can be a typical example for wireless transmission. A USB is popularly used for the communication device.

The ROM is a semiconductor memory in which a processing procedure for the CPU (program) is stored. The present invention can be embodied by such program stored in the ROM. When the program is carried out the RAM functions not only as a work area used by the CPU but also as a buffer memory during communication with the printer 2.

First Embodiment

A first embodiment of a print process of an imaging apparatus according to the present invention will be described below. At first, a structure of an image file to be recorded in the external recording unit 11 of the imaging apparatus will be described, referring to FIG. 2.

Figure 2:
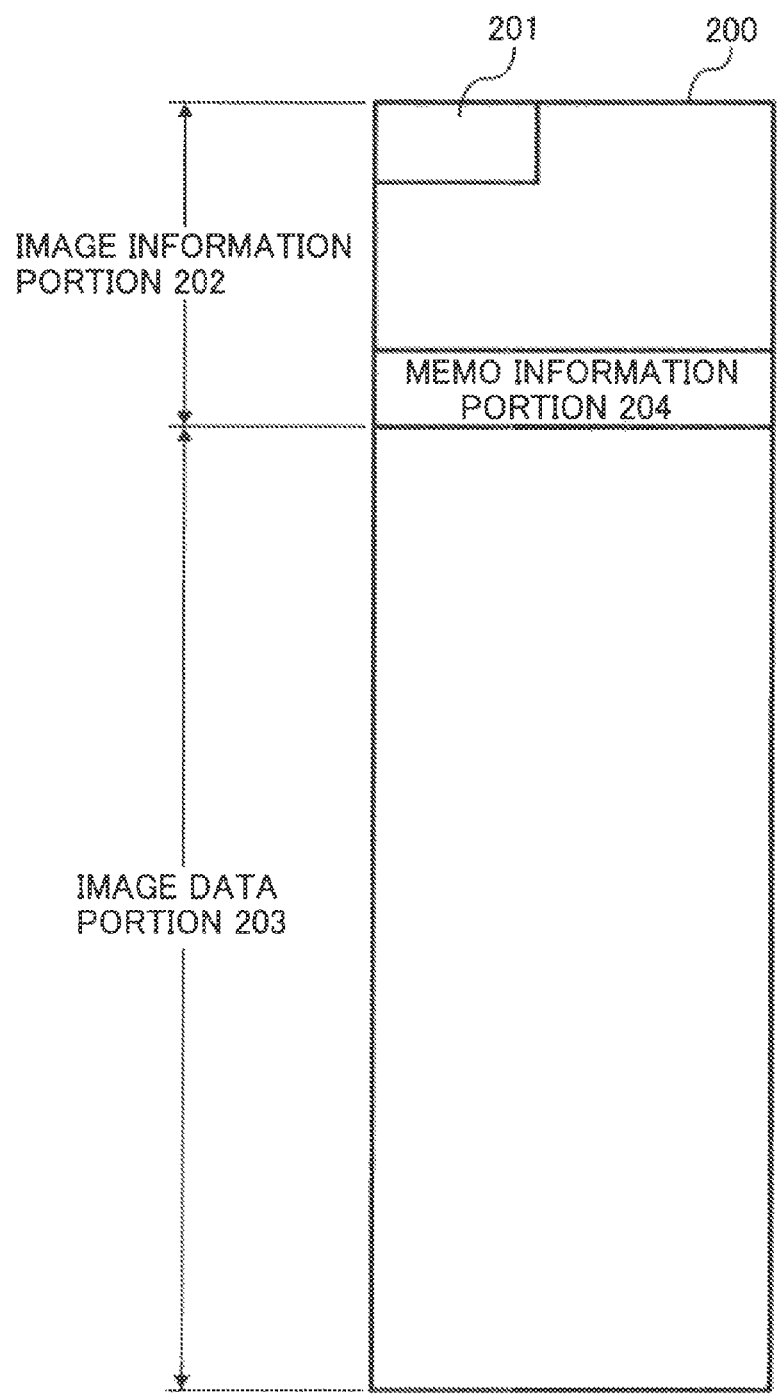
FIG. 2 is a schematic view showing a file type of an image data applicable to the present invention.

FIG. 2 is a schematic view showing the structure of the image file. In FIG. 2 the image file 200 includes an image data portion 203 and an image information portion 202 which is a header portion. A photographed picture image is stored in the image data portion 203, and information about the picture image is stored in the image information portion 202. As the information to be stored, there can be an information classification determined by a prescribed standard as well as an information classification originally determined by each maker. Such information originally determined by a maker is stored in a memo information portion 204 provided within the image information portion 202. In the present invention information stored in the memo information portion 204 is configured to be called "additional information". An additional information existence judgment data 201 that indicates whether additional information exists in the image file or not is stored in the tip portion of the image information portion 202.

A judgment on the additional information with use of the additional information existence judgment data 201 will be explained below. For example, it can be predetermined a regulation that no additional information exists in the image file 200 when the value of the additional information existence judgment data 201 is "00", whereas additional information exists in the image file 200 when the value of the additional information existence judgment data 201 is other than "00". A judgment process can be carried out by way of executing a program process in accordance with such predetermined regulation.

FIG. 3 is a view showing an example of additional information originally determined by a maker, the additional information being configured to be stored in the memo information portion 204. In FIG. 3 the additional information is described as a list form in a text format. The text format is based on a predetermined format.

The image file may be transferred to a personal computer so that the additional information stored in the memo information portion 204 can be made/edited on a personal computer with an exclusive application or a text editor.

A text file describing the additional information to be stored in the memo information portion 204 may be stored in the external recording unit 11 together with a predetermined file name (e.g. "add_dada.mta") so that the contents of the text file can be automatically stored in the memo information portion 204 when the image data is stored in the external recording unit 11 in a imaging operation with use of the digital camera 1.

According to the example of the additional information shown in FIG. 3, "NAME TEXTS" are described between /*ITEM*/ and /*LIST*/. In the example of FIG. 3, three texts consisting of "NAME", "DEPARTMENT" and "POST" are described. The descriptions below "/*LIST*/" compose a list of "CONTENT TEXTS". According to the example of FIG. 3, texts between #01 and #02 correspond to the list of the CONTENT TEXT of "NAME".

In order to store the above-explained additional information automatically, a setting for "Additional Information Exists" need be set before photographing with the digital camera. Specifically, the mode of the digital camera 1 is changed to a "Setup Mode" and then "Additional Information Exists" is selected from a setting menu displayed on the display unit 13 to be "ON" by way of operating operational keys (not shown) provided for the operational table unit 14 of the digital camera 1. As stated above, if the setting of the digital camera 1 is "Additional Information Exists", additional information is stored in every memo information portion 204 of image data taken after the operation for the setting.

If a setting for "Additional Information to be selected Exists" is set in the "Setup Mode", an "Additional Information Selection" screen (not shown) can be displayed on the display unit 13 and additional information can be selectively specified from a group of additional information (readout from the text file) displayed on the screen before subsequently-taken picture images are stored in the external recording unit 11.

Second Embodiment

Figure 4:
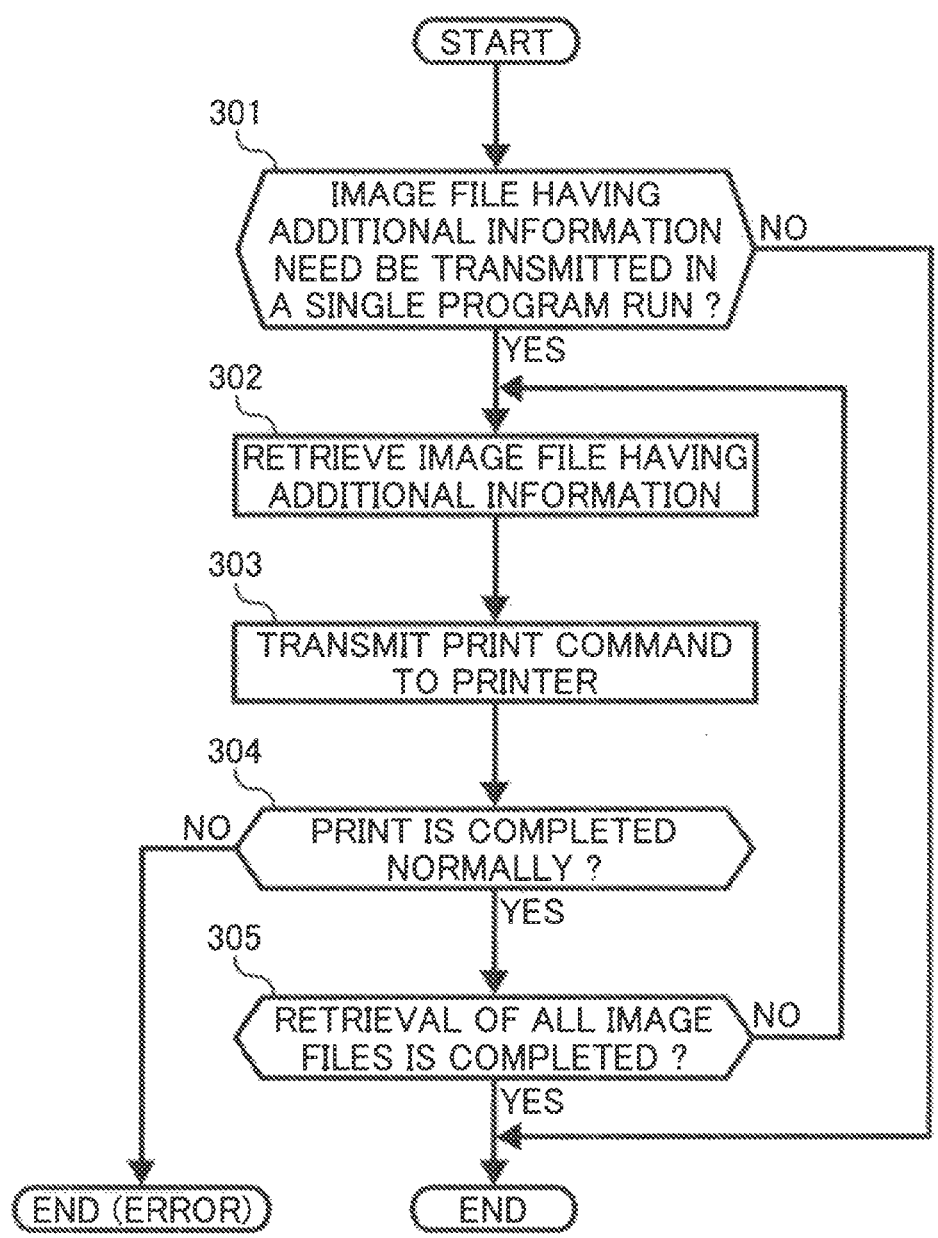
FIG. 4 is a flowchart showing an example of a print process carried out by an imaging apparatus of the present invention.

Next, a batch print process of imaging files to which additional information is added according to an imaging apparatus of the present invention will be described referring to the flowchart of FIG. 4. In FIG. 4, each step (process) is designated by a numeral such as "301", "302" . . . .

The digital camera is connected to the printer 2 via the communication device 3 in advance of execution of the print process.

First, when a user selects "Batch Print of 'Image File to which Additional Information is added' (piece by piece)" from a "Determination of Print" screen (not shown) displayed on the display unit 13 by operating the operational table unit 14, a print process therefor starts. If another option other than "Batch Print of 'Image File to which Additional Information is added' (piece by piece)" is selected, a print process therefor ends and the pint process of the selected option starts ("NO" at Step 301).

If "Batch Print of 'Image File to which Additional Information is added' (piece by piece)" is selected ("YES" at Step 301), only image files to which additional information is added are searched from image files stored in the external recording unit 11 (Step 302).

Such search of image files can be performed by checking the values of the additional information existence judgment data 201 which respectively exist in the image information portions 202 as header portions of the image files. Only (an) image files in which additional information existence judgment data 201 having the predetermined value (e.g. a value other than "00" in the above-mentioned case having the regulation that if the value of the additional information existence judgment data 201 is other than "00", additional information exists in the image file 200) is stored are extracted and temporarily recorded in the RAM of the entire control unit 10.

File names of the image files recorded in the RAM according to the process are read out and a print request is generated to carry out a print process only for image files each having additional information. The request is transmitted to the printer 2 (Step 303).

An example of a print request to be transmitted to the printer 2 from the digital camera 1 in the print process is shown in FIG. 8. In FIG. 8, the print request includes an information identifier 81 indicating that the information is a print request (a request for printout), a file identifier 82 for indicating a file name of a image file having additional information to be printed out, and a file name 83 of the image file. The printer 2 which has received the print request requests the digital camera 1 to send thereto image files described in the print request, and the digital camera 1 sends the requested image files to the printer 2.

The digital camera 1 receives a result of the print process implemented according to the print request (Step 304), and if the print result indicates an error, the print process ends ("NO" at Step 304). If the print result indicates a normal completion ("YES" at Step 304), the process returns to Step 302 to continue the process until the completion of the print process of all the image files each having additional information as objects to be printed out stored in the external recording unit 11 (Step 305).

Third Embodiment

Figure 5:
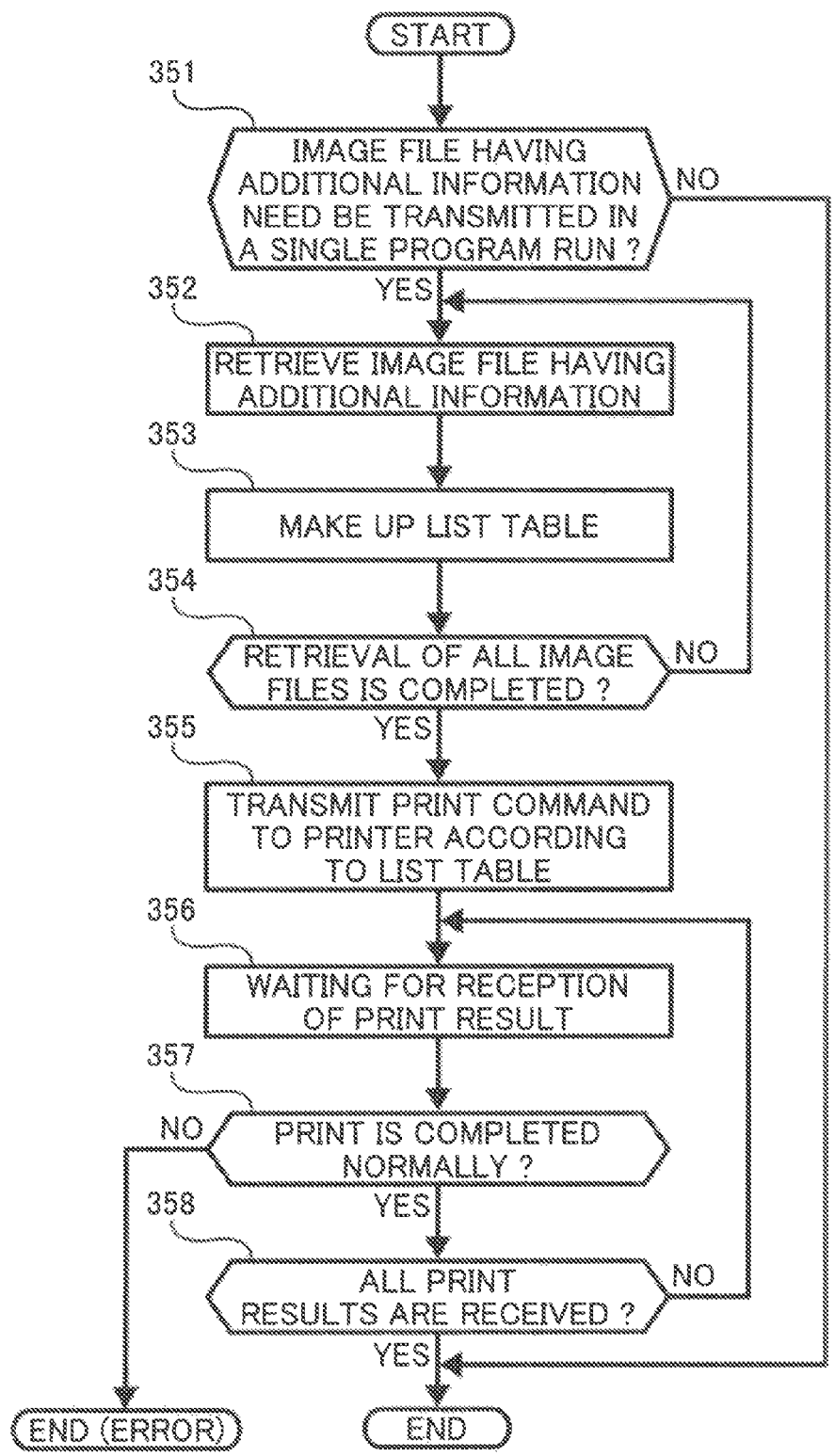
FIG. 5 is a flowchart showing another example of a print process carried out by an imaging apparatus of the present invention.

Next, another example of a batch print process of an imaging file to which additional information is added according to an imaging apparatus of the present invention will be described referring to the flowchart of FIG. 5. In FIG. 5, each step (process) is designated by a numeral such as "351", "352" . . . .

The digital camera is connected to the printer 2 via the communication device 3 in advance of execution of the print process.

First, when a user selects "Batch Print of 'Image File to which Additional Information is added' (all together)" from a "Determination of Print" screen (not shown) displayed on the display unit 13 by operating the operational table unit 14, a print process therefor starts. If another option other than "Batch Print of 'Image File to which Additional Information is added' (all together)" is selected, a print process therefor ends and the pint process of the selected option starts ("NO" at Step 351).

If "Batch Print of 'Image File to which Additional Information is added' (all together)" is selected ("YES" at Step 351), only "Image File(s) to which Additional Information is added" is searched from image files stored in the external recording unit 11 (Step 352).

Such search of image files is performed by check on the values of the additional information existence judgment data 201 which respectively exist in the image information portions 202 as header portions of the image files. Only (an) image files in which additional information existence judgment data 201 having the predetermined value (e.g. a value other than "00" in the above-mentioned case having the regulation that if the value of the additional information existence judgment data 201 is other than "00", additional information exists in the image file 200) is stored are extracted and temporarily recorded in the RAM of the entire control unit 10.

Every time an image file is detected in the search process the file name thereof is stored in a list table as shown in FIG. 9. The list table is made on the RAM (Step 353).

The search process is continued until all image files concerned in the image files stored in the external recording unit 11 are detected. Specifically, the process flow returns to Step 352 until search of all image files is completed ("NO" at Step 354). When the search process for all image files stored in the external recording unit 11 is completed the flow moves to the next process ("YES" at Step 354).

Next, a print request to a printer is generated based on the list table made on the RAM according to the search process. As shown in FIG. 10 all image file names detected in the search process are described in "image file name(s)" included in the print request to a printer. This print request is transmitted to the printer 2 (Step 355).

Next, a result of the print process according to the print request from the printer 2 is received (Step 356). If the print result indicates an error, the print process ends ("NO" at Step 357). If the print result indicates a normal completion ("YES" at Step 357), it is judged whether the print result of all image files included in the print request is received or not. In the case such print result of all image files is not received, the process flow moves to Step 356. In the case such print result of all image files is received, the print process ends (Step 358).

Fourth Embodiment

Figure 12A:
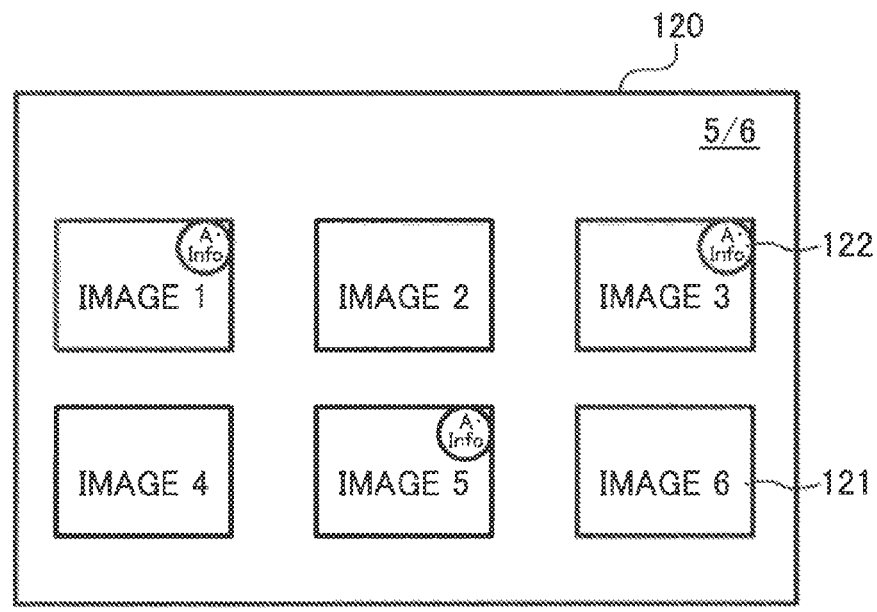
FIGS. 12A and 12B are explanatory views showing an example of screen display of a display device of an imaging device according to the present invention.
Figure 12B:
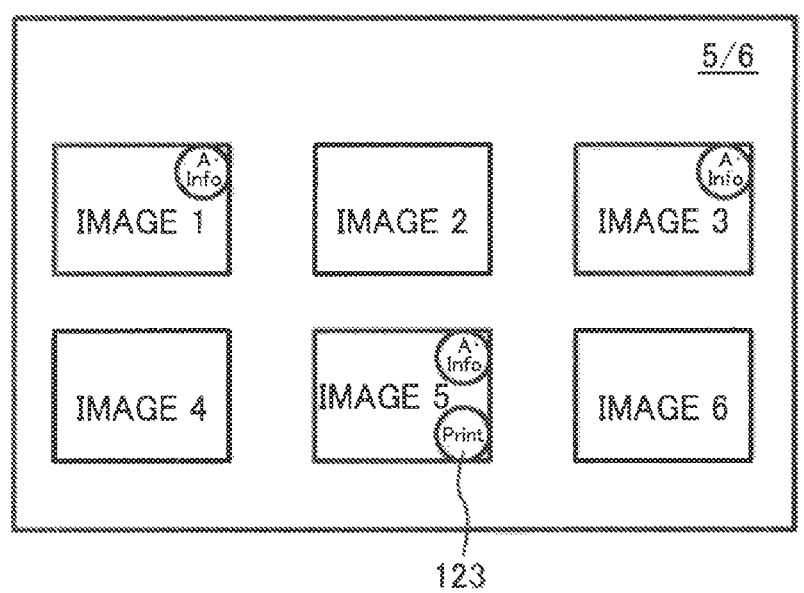

Another example of a batch print process of an imaging file to which additional information is added according to an imaging apparatus of the present invention will be described below. FIGS. 12A and 12B are views showing an example of a screen displayed on the display unit 13 when a user sets image files to be printed out. Thumbnails 121 are displayed on the screen 120 in FIG. 12A. A thumbnail 121 corresponding to an image file having additional information is displayed together with an additional information mark ("A-Info") 122 attached thereto. When the user selects a thumbnail 121 displayed on the screen 120 for printout by operating the operational table unit 14, the selected thumbnail 121 is displayed together with a printout mark ("Print") 123 attached thereto as shown in FIG. 12B. As described above, in the case a user explicitly selects an image file(s) having additional information for printout, such selection may be made by selecting an image having thereon an additional information mark 122 displayed on the screen 120 of the display unit 13.

Fifth Embodiment

Figure 6:
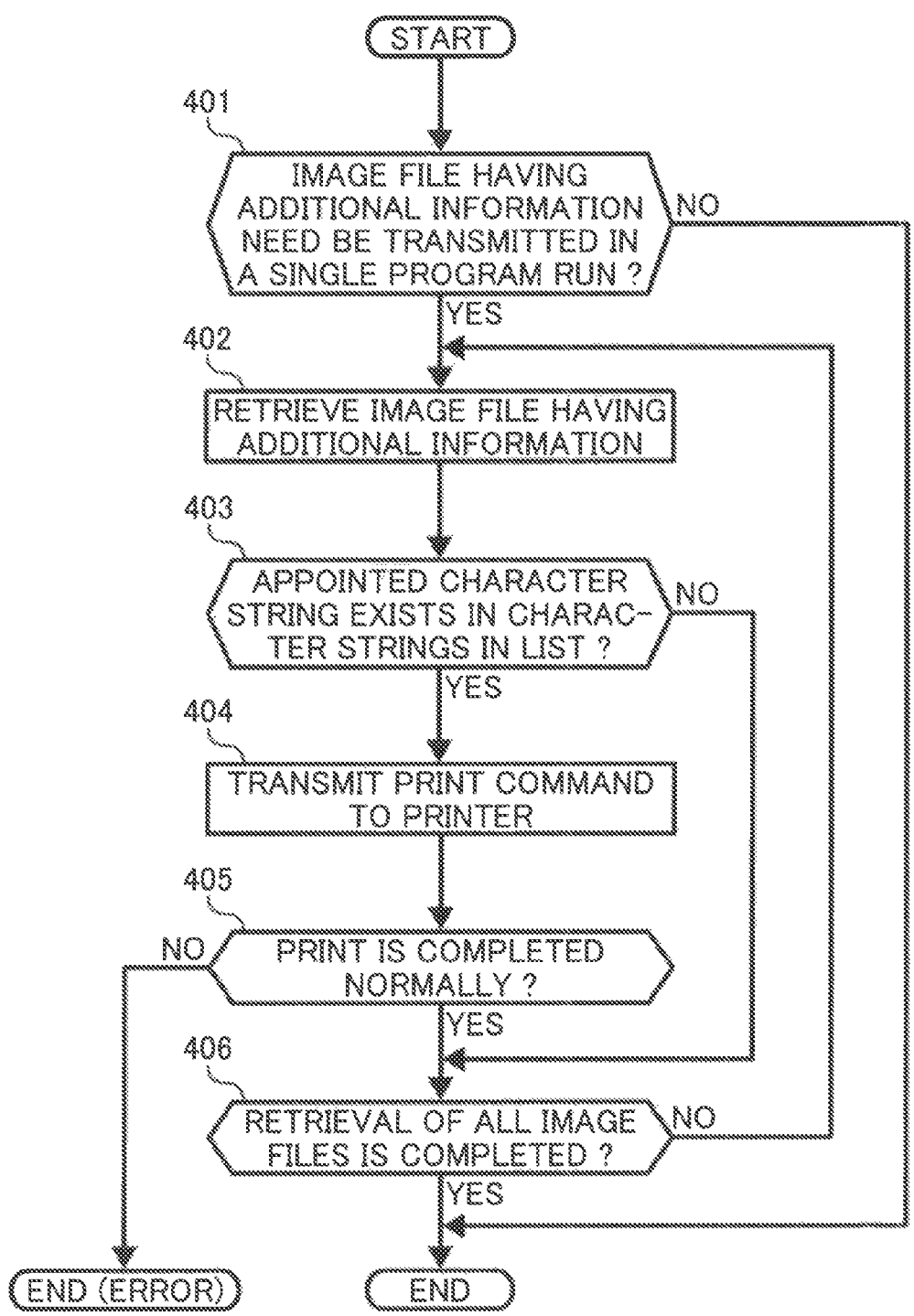
FIG. 6 is a flowchart showing another example of a print process carried out by an imaging apparatus of the present invention.

Another embodiment of a print process of an imaging apparatus according to the present invention will be described referring to the flowchart of FIG. 6. In FIG. 6, each step (process) is designated by a numeral such as "401", "402"....

The digital camera is connected to the printer 2 via the communication device 3 in advance of execution of the print process.

First, when a user selects "Specifying Character String Print of 'Image File to which Additional Information is added' (piece by piece)" from a "Determination of Print" screen (not shown) displayed on the display unit 13 by operating the operational table unit 14, a print process therefor starts ("YES" at Step 401). If another option other than "Specifying Character String Print of 'Image File to which Additional Information is added' (piece by piece)" is selected, a print process therefor ends and the pint process of the selected option starts ("NO" at Step 401).

It is displayed on the display unit 13 a "screen for specifying character string(s)" (not shown) which displays a list of description contents of text files describing additional information, which are stored in the external recording unit 11. The user can select a search keyword on the screen for specifying character string(s) by operating the operational table unit 14.

A method for specifying a search keyword in this embodiment is not limited to the above-described method. For example, a character string as a search condition may be inputted by a user with use of a software keyboard screen (not shown) displayed on the display unit 13. When a search keyword is specified, only image files satisfying the imputed search condition are retrieved among the image files recorded in the external recording unit 11 (Step 402).

Also, all texts described in the additional information files stored in the external recording unit 11 may be retrieved and displayed as a list on the display unit 13 so that a user can select a search keyword from the displayed list.

As described above, when a search condition is specified image files stored in the external recording unit 11 of the digital camera 1 are searched (Step 402).

In an image file having additional information, the additional information is stored in text format in the image information portion 202 as the header portion of the image file. Thus, if the ASCII code of the character string specified by the appointment of the search condition is consistent with the ASCII code stored in additional information of an image file, such image file is the image file to be printed out. A print request including file names of the image files whose ASCII codes correspond to the ASCII code of the specified character string in the above-described process is transmitted to the printer 2 (Step 403).

FIG. 8 is a view showing an example of the print request to be transmitted to the printer 2 from the digital camera 1 in the print process. In FIG. 8, the print request includes an information identifier 81 indicating that the information is a print request, a file identifier 82 for indicating a file name of a image file having additional information to be printed out, and a file name 83 of the image file. The printer 2 which has received the print request requests the digital camera 1 to send thereto image files described in the print request, and the digital camera 1 sends the requested image files to the printer 2 (Step 404).

The digital camera 1 receives from the printer 2 a result of the print process implemented according to the print request (Step 405). If the print result indicates an error ("NO" at Step 405), the print process ends. If the print result indicates a normal completion ("YES" at Step 405), the process returns to Step 402 to continue the process until the completion of the print process of all the image files having additional information as objects to be printed out stored in the external recording unit 11 (Step 406).

Sixth Embodiment

Figure 7:
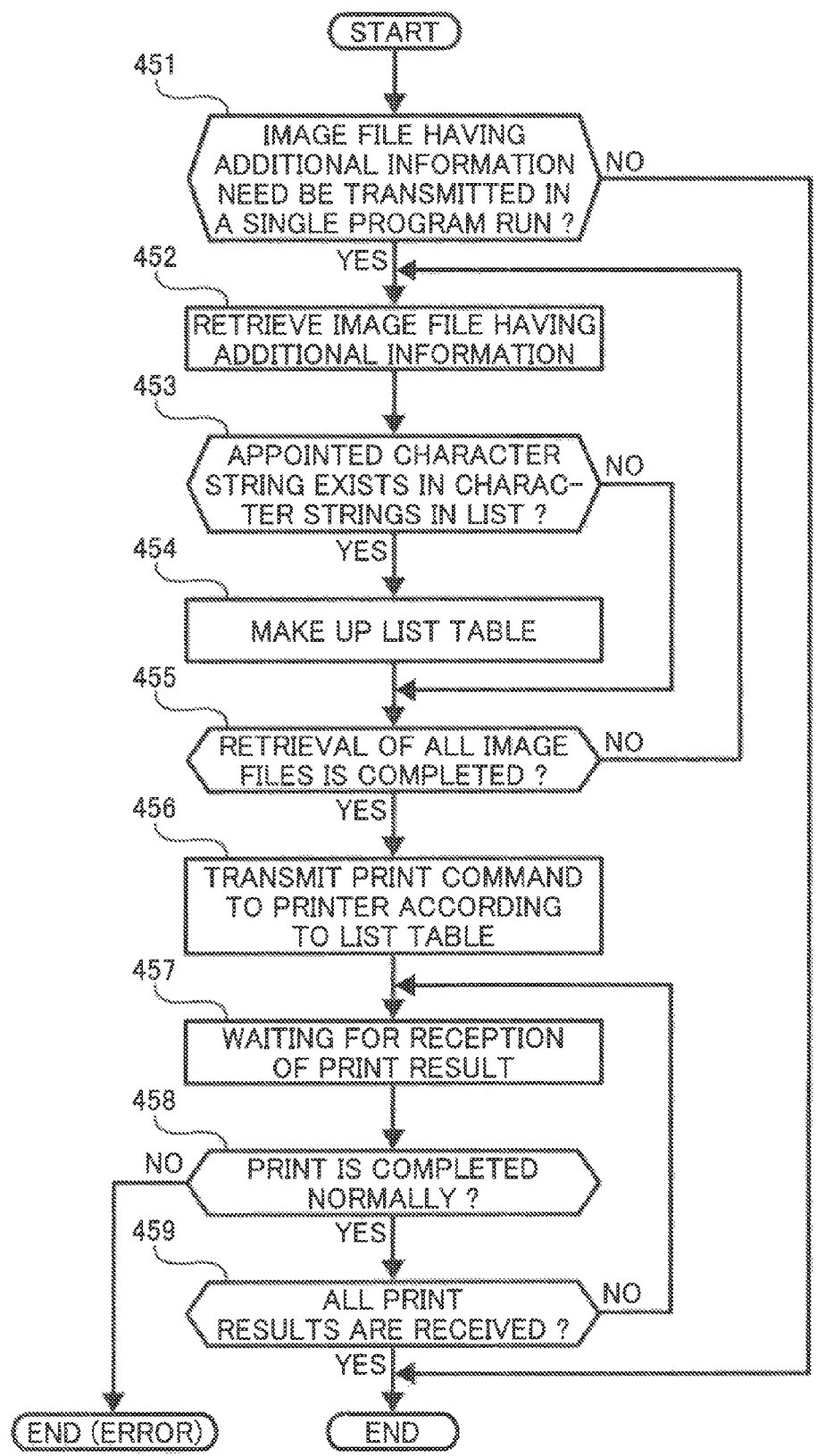
FIG. 7 is a flowchart showing another example of a print process carried out by an imaging apparatus of the present invention.

For use in the search process of the fifth embodiment a print process in which all retrieved image files are transmitted all together to a printer will be described below, rather than a print process in which a retrieved image files are individually processed for printout. FIG. 7 is a flowchart showing a print process according to this embodiment. In FIG. 7 each step (process) is designated by a numeral such as "451", "452"....

The digital camera is connected to the printer 2 via the communication device 3 in advance of execution of the print process.

First, when a user selects "Specifying Character String Print of 'Image File to which Additional Information is added' (all together)" from a "Determination of Print" screen (not shown) displayed on the display unit 13 by operating the operational table unit 14, a print process therefor starts ("YES" at Step 451). If another option other than "Specifying Character String Print of 'Image File to which Additional Information is added' (all together)" is selected, a print process therefor ends and the pint process of the selected option starts ("NO" at Step 451).

Next, a search condition is specified by a user. A character string as the search condition is appointed on the "screen for specifying character string(s)" displayed on the display unit 13 through handling of the operational table unit 14 by the user. In order to determine whether any image file corresponding to the specified search condition exists or not a search based on the search condition is performed on memo information portions 204 of the image files corresponding to the image file names temporarily recorded in the RAM in the above-described process (Step 453).

As a result of the search process, if no information consistent with the search result exists in any memo information portions of the image files having the image file names read out from the RAM ("NO" at Step 453), the process flow moves to Step 455.

As a result of the search process, if information consistent with the search result exists in any memo information portions of the image files having the image file names read out from the RAM ("YES" at Step 453), the image file names of such image files are added to a list table (Step 454). This list table is generated on the RAM.

Next, if the search process for all image files corresponding to the image file names which exist on the RAM is not completed ("NO" at Step 455), the process flow moves to Step 452 to perform the process repeatedly.

An example of a list table generated in the above-described process is shown in FIG. 9. According to FIG. 9, file names of image files detected by the search process are described in series in the list file. A print request is made with use of the file names described in the list file and is transmitted to a printer (Step 456).

Then the digital camera 1 receives from the printer a result of the print process implemented according to the print request (Step 457). If the print result indicates an error ("NO" at Step 458), the print process ends. If the print result indicates a normal completion ("YES" at Step 458), the process returns to Step 457 to continue the process until the completion of the print process of all the image files having additional information as objects to be printed out stored in the external recording unit 11 (Step 459).

Seventh Embodiment

Figure 11:
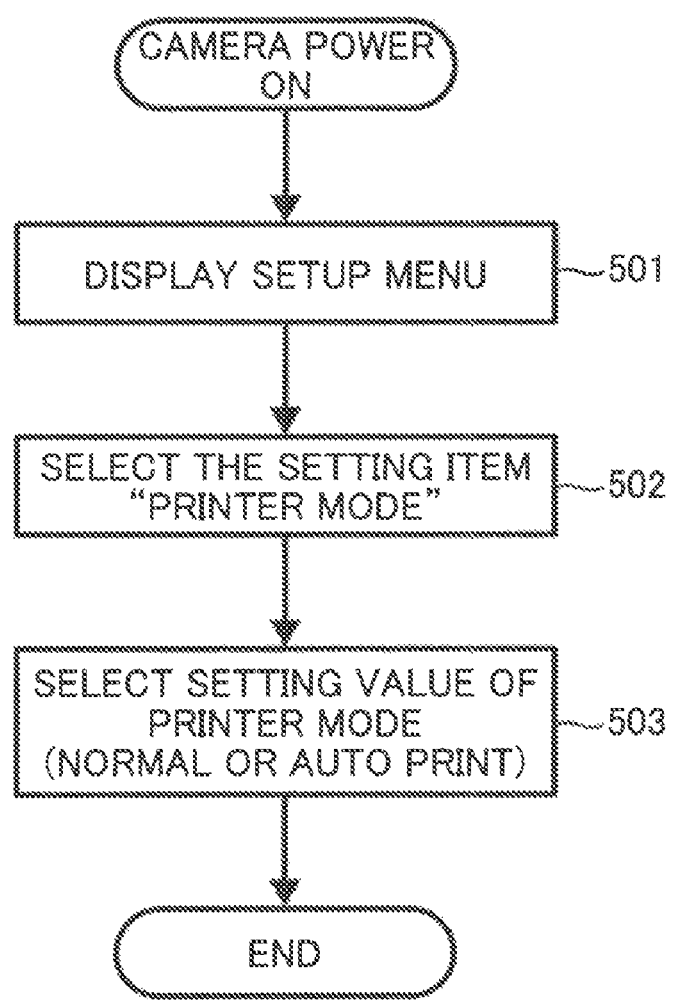
FIG. 11 is a flowchart showing another example of a print process carried out by an imaging apparatus of the present invention.

Another embodiment of a print process of an imaging apparatus according to the present invention will be described referring to the flowchart of FIG. 11. In FIG. 11, steps are designated by numerals: "501"; "502"; and "503".

The power of the digital camera 1 is turned on to start the operation of the digital camera 1. If a SETUP MODE is selected by way of handling of the operational table unit 14, a SETUP MENU is displayed on the display unit 13 (Step 501)

Figure 13A:
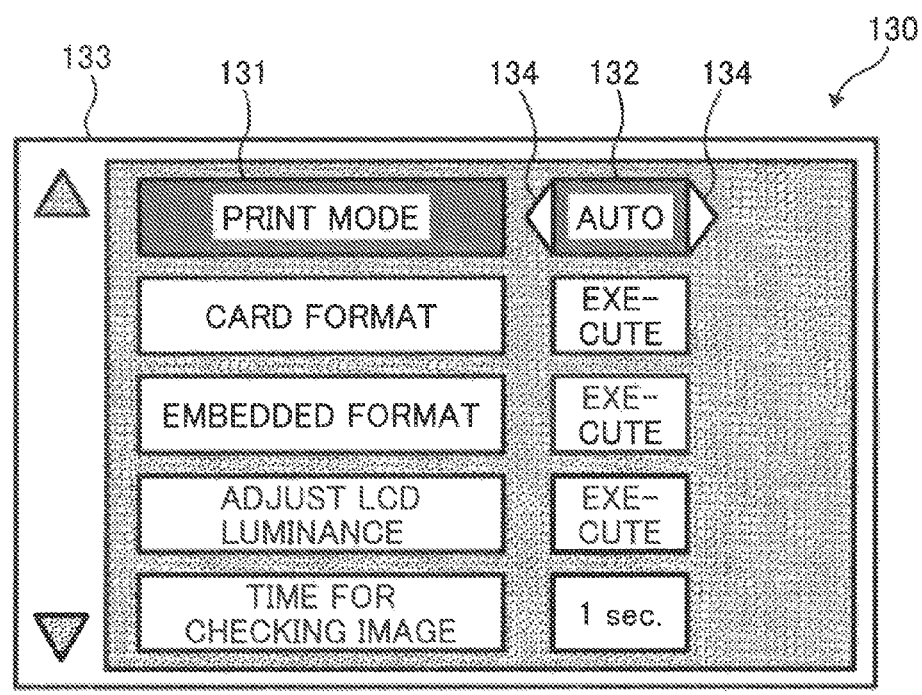
FIGS. 13A and 13B are views showing a display example of a print-mode setting screen for an imaging apparatus according to the present invention.
Figure 13B:
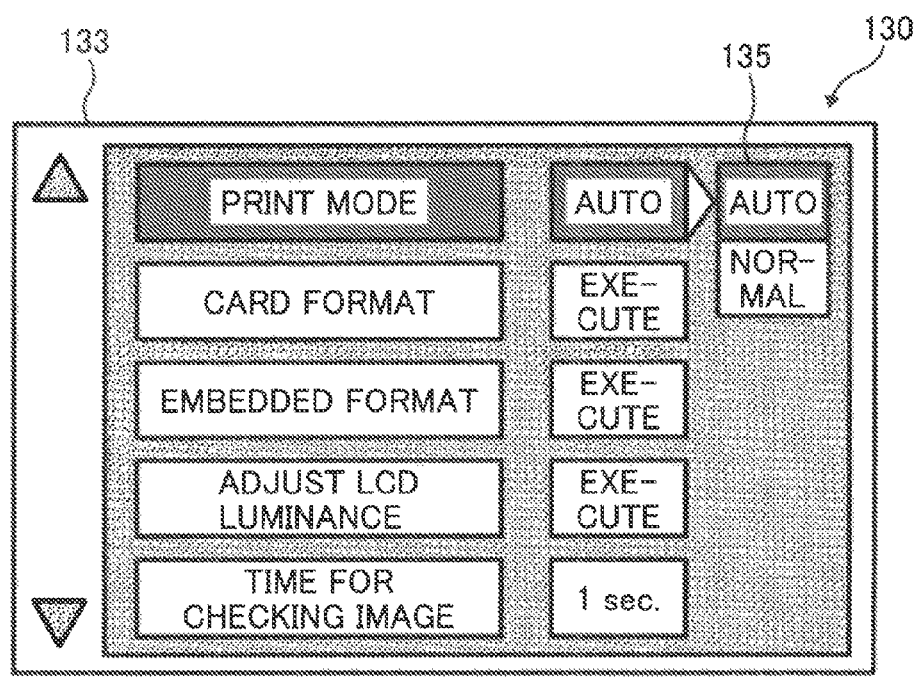

An example of a screen for the SETUP MENU displayed on the display unit 13 is shown if FIGS. 13A and 13B. In FIG. 13A, setting items 131 and setting information 132 are displayed and a scroll bar for indicating whether or not further setting items exist above/below the setting items 131 currently displayed on the screen. A user may mate a cursor 134 with a desired setting item 131 and press a button (not shown) by operating the operational table unit 14 to make necessary settings.

If the cursor 134 is mated with the setting item "PRINT MODE" in FIG. 13A and the button (not shown) is pressed, setting options 135 are displayed as shown in FIG. 13B (Step 502). A value selected in the setting options 135 is set as a set value of "PRINT MODE" (Step 503).

If "NORMAL" is selected in the SETUP MENU screen and the imaging apparatus is connected to a printer, the imaging apparatus works in accordance with a normal mode in which printout is performed after an image(s) is selected. Alternatively, if "AUTO" is selected and the imaging apparatus is connected to a printer, a print process for all image files to which image information is added is automatically carried out.

The present invention can be also applied to an information device such as a portable telephone having an imaging apparatus or a portable information terminal device having an imaging apparatus, which may be connected to a printer, e.g., with a USB connection.

As described above, according to the present invention, since a print process only for image files each including additional information is automatically carried out, all image files each including additional information can be printed out easily. Further, image files each including specified information can be easily extracted from image files each including additional information and be easily print-processed according to the present invention.

What is claimed is:

1. An imaging apparatus, comprising:
a recording unit configured to record as an image file image data generated by conversion from an optical image representing a subject to an electrical signal in an imaging device;
a recording medium that stores a plurality of image files recorded by the recording unit;
an interface that connects the imaging apparatus to a printer;
an information adding unit configured to add information to the image file; and
a print request unit configured to transmit a request to the printer to print out only the image file to which the information is added by the information adding unit from the plurality of image files stored by the recording medium,
wherein a request to print out only an image file to which information including specified information is added by the information adding unit is transmitted to the printer, and
wherein the imaging apparatus includes an input device that selects whether only the image file to which information including specified information is added by the information adding unit is requested to be printed out.

2. The imaging apparatus according to claim 1, further comprising:
a display that indicates when the input device has selected whether only the image file to which the information is added by the information adding unit is requested to be printed out.

3. An information device, comprising the imaging apparatus according to claim 1.

4. An imaging method, comprising:
recording as an image file image data generated by conversion from an optical image representing an imaged subject;
storing a plurality of recorded image files;
communicating with a printer connected through a communication interface;
adding information to the image file; and
requesting the printer to print out only the image file to which the information is added in the adding process from the plurality of recorded image files,
wherein a request to print out only an image file to which information including specified information is added in the adding process is transmitted to the printer, and
wherein the imaging method includes selecting whether only the image file to which information including the specified information is added in the adding process is requested to be printed out.

5. An imaging apparatus, comprising:
a recording unit configured to record as an image file image data generated by conversion from an optical image representing a subject to an electrical signal in an imaging device;
a recording medium that stores a plurality of image files recorded by the recording unit;

an interface that connects the imaging apparatus to a printer;

an information adding unit configured to add information to the image file; and a print request unit configured to transmit a request to the printer to print out only the image file to which the information is added by the information adding unit from the plurality of image files stored by the recording medium, wherein the image file includes a header portion including a memo information portion that stores the information added by the information adding unit and an information existence judgment data portion that indicates whether the information added by the information adding unit is stored in the header portion.

6. The imaging apparatus according to claim 5, wherein the print request unit transmits the request to the printer to print out only the image file that includes the information existence judgment data portion that indicates whether the information added by the information adding unit is stored.

* * * * *